United States Patent [19]

Kreitzer

[11] Patent Number: 5,282,197

[45] Date of Patent: Jan. 25, 1994

[54] LOW FREQUENCY AUDIO SUB-CHANNEL EMBEDDED SIGNALLING

[75] Inventor: Stuart S. Kreitzer, Boca Raton, Fla.

[73] Assignee: International Business Machines, Armonk, N.Y.

[21] Appl. No.: 884,494

[22] Filed: May 15, 1992

[51] Int. Cl.$^5$ ............................................. H04J 3/12
[52] U.S. Cl. ................................ 370/76; 370/110.1; 379/98
[58] Field of Search .............. 370/69.1, 76, 110.1, 370/110.4, 111, 113, 71, 72, 11, 125; 379/93, 97, 98; 375/27, 30, 45

[56] References Cited

U.S. PATENT DOCUMENTS

| | | | |
|---|---|---|---|
| 1,469,832 | 10/1923 | Hamilton | 370/76 |
| 2,352,918 | 7/1944 | Smith | 370/125 |
| 3,666,889 | 5/1972 | Zegers et al. | 370/110.4 |
| 4,757,501 | 7/1988 | Gorshe | 370/110.1 |
| 4,928,276 | 5/1990 | Blondeau, Jr. et al. | 370/110.1 |

Primary Examiner—Benedict V. Safourek
Attorney, Agent, or Firm—George E. Grosser; Douglas R. McKechnie

[57] ABSTRACT

A T1 based digital transmission system includes audio subchannel embedded signalling, instead of "robbed bit" signalling, to transmit signalling information along with voice communications. Signalling bits are produced in a sub-audio range and combined with voice information signals in the audio range. The resultant signal is transmitted over a T1 link to a receiver which recovers the signalling bits and voice information signals. The technique can be applied using adaptive pulse code modulation to increase the number of channels. A digital signal processor can implement channel functions.

6 Claims, 5 Drawing Sheets

LOW FREQUENCY AUDIO SUB-CHANNEL EMBEDDED SIGNALLING

BACKGROUND OF THE INVENTION

A T1 digital transmission system is a publicly known telephony system in which a plurality of pulse coded modulation (PCM) voice signals are transmitted by a single digital transmission link using time division multiplexing. Along with the voice signals, signalling data known as the A-bit and B-bit, are also transmitted to provide signalling information (such as on-hook, off-hook, dialing digits, and call progress information). T1 transmission normally uses a technique called "robbed bit" signalling which allows the signalling data to be multiplexed onto the transmission link along with the voice signals. Disadvantageously, robbed bit signalling degrades the fidelity of the voice channels, makes tandem links difficult to implement, and poses other significant problems with adaptive pulse code modulation (ADPCM) links.

There are two framing formats commonly used for T1 transmission: an older D4 format, and a newer extended superframe format (ESF). Since both formats are similar in so far as signalling is concerned, only the D4 format is discussed herein. In D4 framing, 8000 frames per second are transmitted. Each frame has 193 sequential bits including one framing bit and 192 voice bits. The voice bits include an 8 bit PCM sample from each of twenty four channels. Thus, twenty four samples are time division multiplexed (TDM). Each 8 bit PCM sample is obtained by sampling a voice signal at an KHZ sampling rate to produce a 64K bps (8 bit sample and 8 Khz sampling rate) signal that is TDM with 23 other TDM channels to produce a resultant digital transmission rate of 1.544 Mbps.

The frames are transmitted in sequential groups of twelve frames. Each group in known as a multiframe. Signalling information is conveyed in each channel in the least significant bit (bit 8) of frames 6 and 12 of a 12-frame multiframe. Such signalling method is known as the "robbed bit" method because the signalling bits displace the original least significant bit of the voice signal in frames 6 and 12. That causes a degradation in the quality of the voice signal. Instead of the original 8 bit dynamic range for which the voice signal was originally quantized, the dynamic range is reduced to seven-and-a-fraction bits with a resultant increase in quantization noise and harmonic distortion.

Another disadvantage of robbed bit signalling occurs when a telephone call spans three or more telephone switches referred to as a tandem connection. Consider a call which originates on switch A, connects to switch B, and finally terminates at switch C. Switches A and C are generally not synchronized as far as multiframes are concerned, and consequently, switch C cannot easily recover the signalling bits conveyed in frames 6 and 12. In fact, a great deal of hardware and/or software complexity is required to convey the signalling bits on a tandem connected communications link.

ADPCM introduces a further problem with robbed bit signalling. In ADPCM, two audio channels are compressed to fit into the bandwidth of a single PCM audio channel. Each of the original audio channels (8 bit samples) effectively occupy a 4-bit sample. When robbed bit signalling is introduced onto ADPCM links, the resulting degradation in dynamic range and voice fidelity is even more severe than with conventional PCM. Another approach to ADPCM alleviates the degradation in voice quality by combining the signalling bits of each channel onto a common channel. However, this means that one of the available channels is now dedicated to carrying signalling information and therefore cannot be used as a voice channel. Consequently, a voice channel is effectively lost or eliminated.

SUMMARY OF THE INVENTION

One of the objects of the invention is to provide improved method and apparatus for T1 digital transmission in which voice and signalling information are transmitted by audio subchannel embedded signalling (ASES).

Another object of the invention is to employ an unused part of the audio frequency spectrum (below 300 Hz) as a low speed frequency shift keying (FSK) modulated link for transmitting the signalling information, instead of "robbing bits" periodically from each voice channel, while the remaining bandwidth (300 to 3,000 Hz) of each telephony channel is used in its usual manner for carrying the voice communication.

A further object of the invention is to solve or eliminate the above described problems associated with robbed bit signalling by maintaining full eight bit quantization for each voice channel and thereby transmit voice signals with improved, higher fidelity.

Still another object of the invention is to produce a coded signal that combines both signalling bit information and voice information that can be compressed by adaptive pulse code modulation and combined with information from other channels for transmission on a T1 transmission path.

A still further object of the invention is to implement ASES in a digital signal processor for transmission over a T1 link.

Briefly, in accordance with the invention, signalling bits are produced in a sub-audio range and combined with voice information signals in the audio range. The resultant signal is transmitted over a T1 link to a receiver which recovers the signalling bits and voice information signals.

DRAWINGS

Other objects and advantages of the invention will be apparent from the following description taken in connection with the accompanying drawings wherein.

Figure 3:
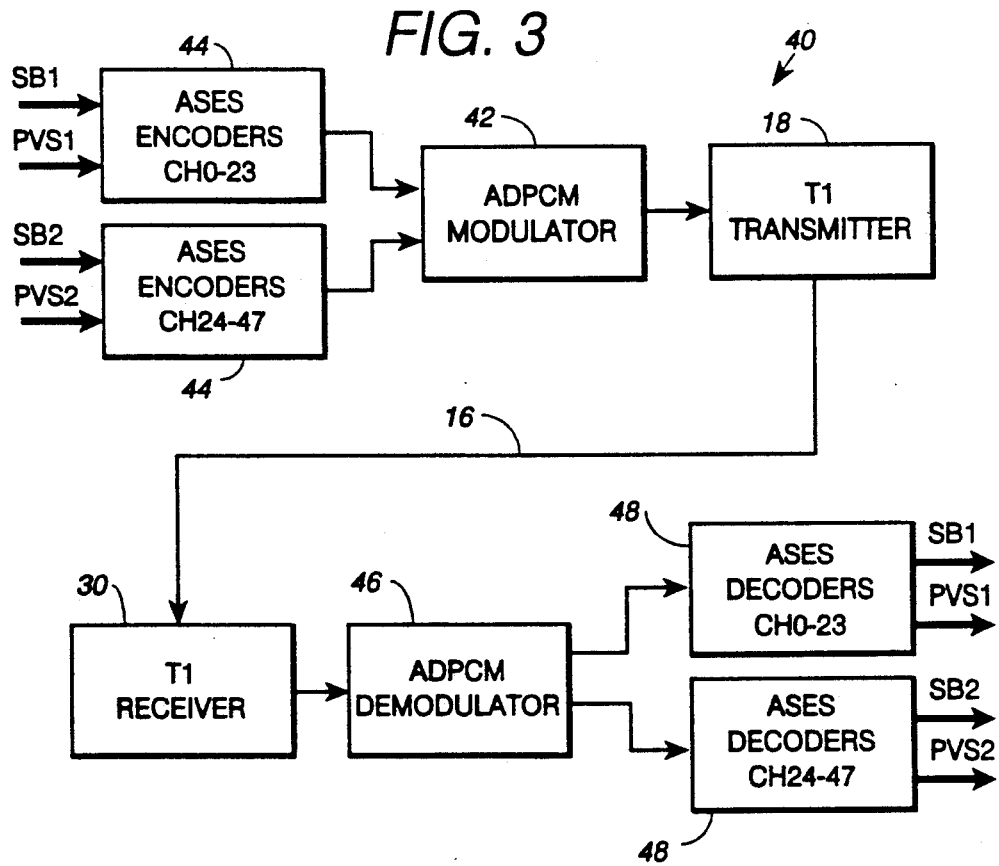
Figure 4:
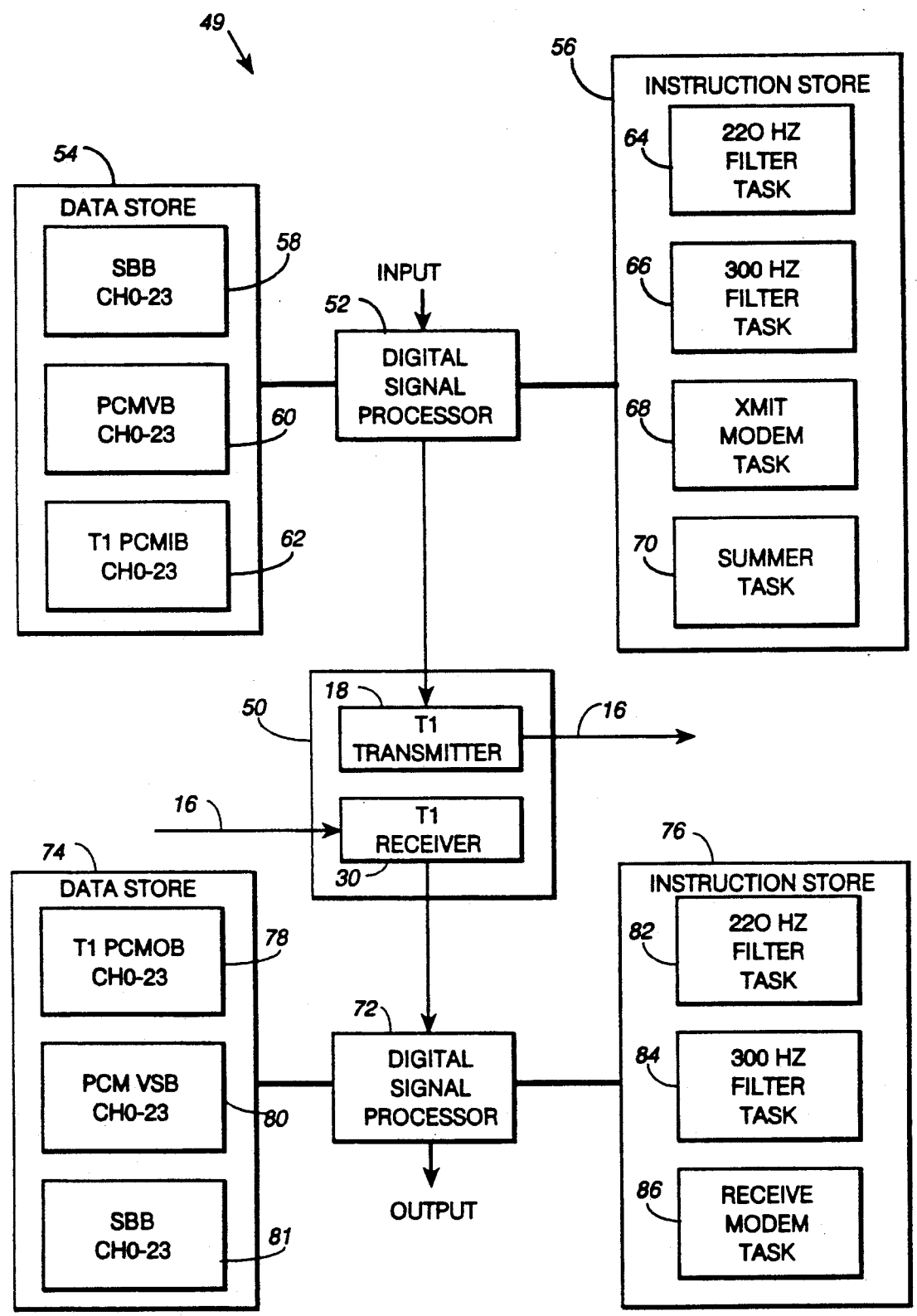
Figure 5:
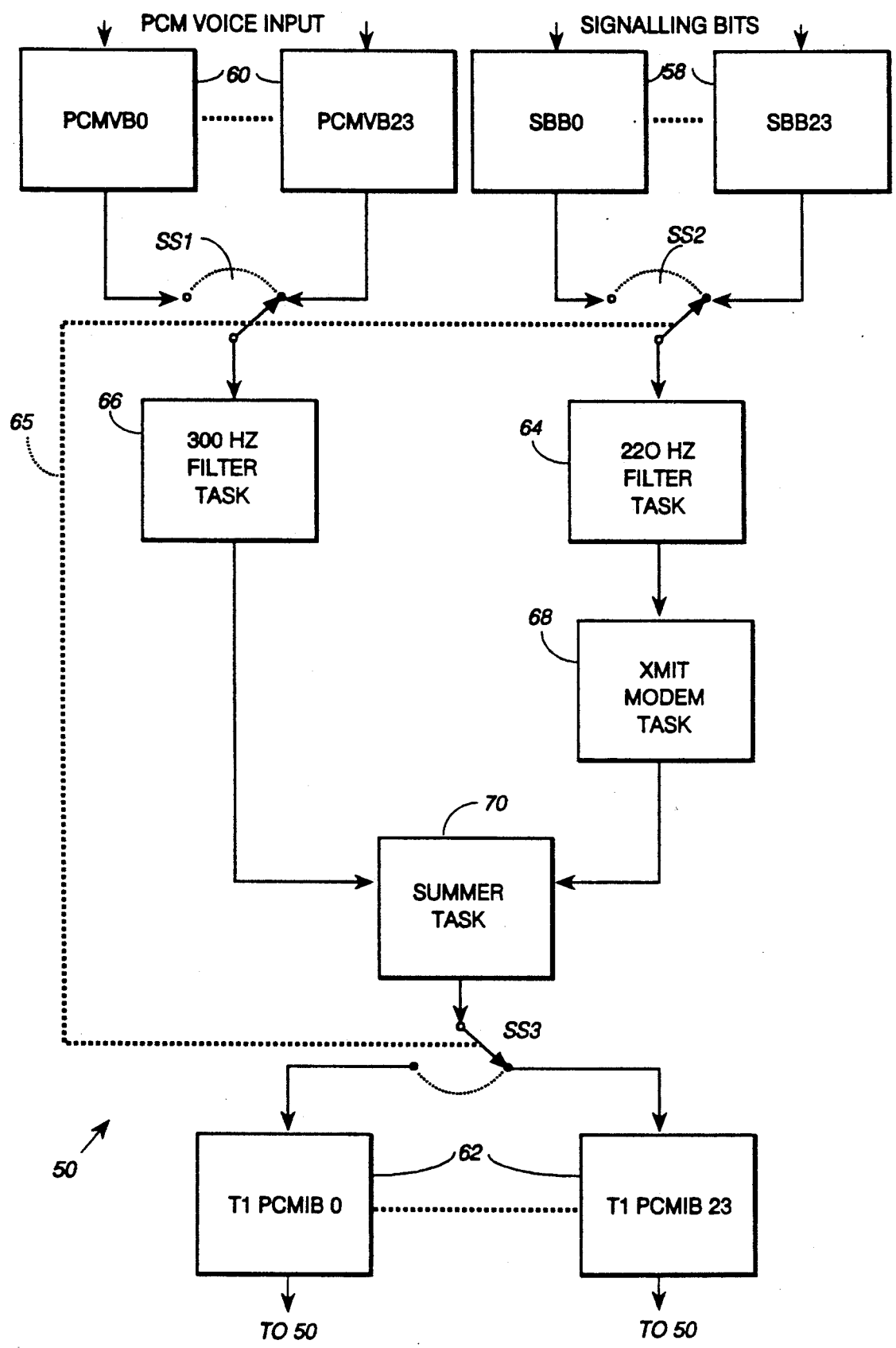
Figure 6:
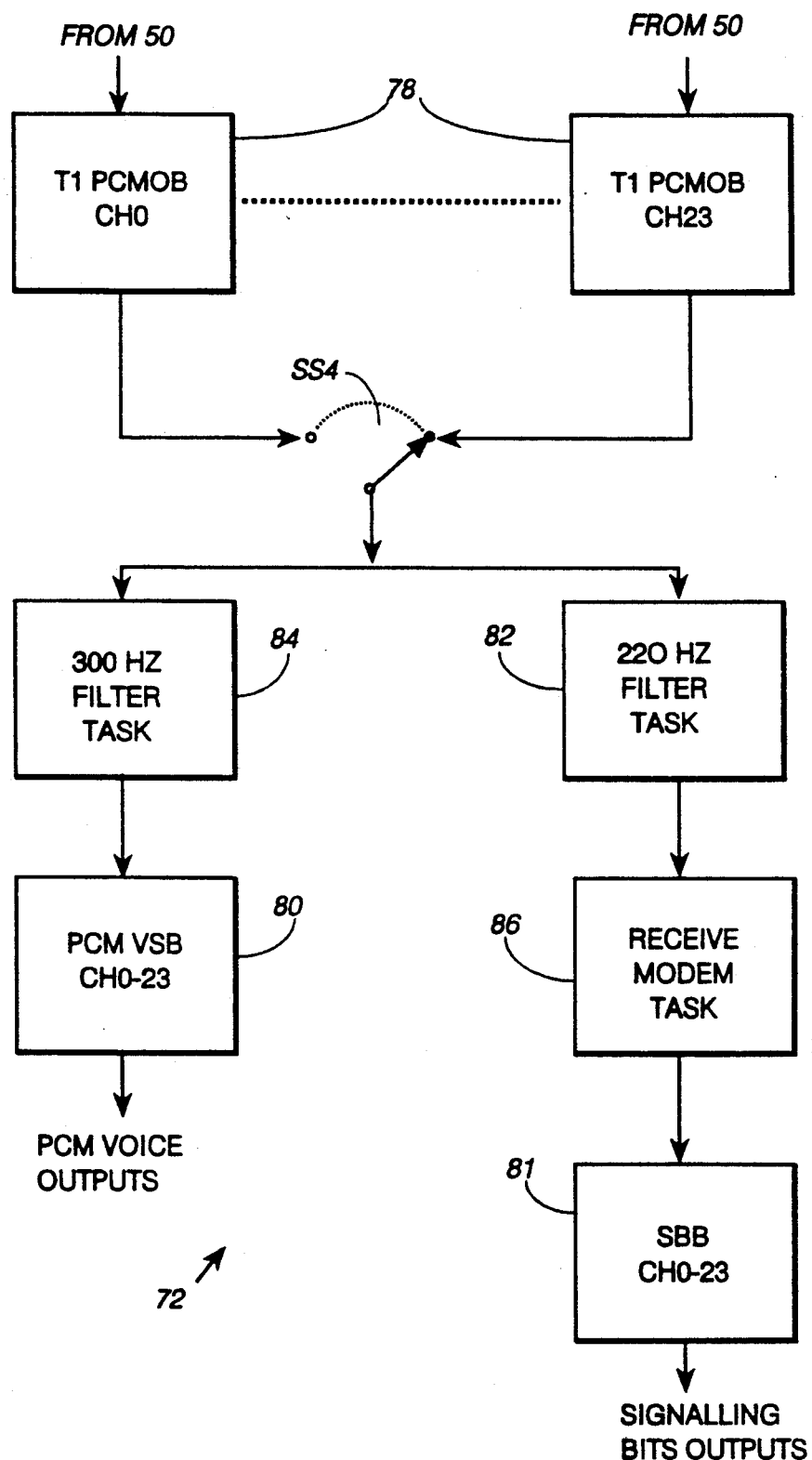

FIG. 3 block diagram of a first alternate embodiment of the invention implemented using ADPCM;

FIG. 4 is a block diagram of a second alternate embodiment of the invention implemented using a digital signal processor;

FIG. 5 is a schematic diagram illustrating operation of the transmitter portion of the embodiment shown in FIG.4; and FIG. 6 is a schematic diagram similar to FIG. 5 but illustrating operation of the receiver portion of the embodiment shown in FIG. 4.

DETAILED DESCRIPTION

Figure 1:
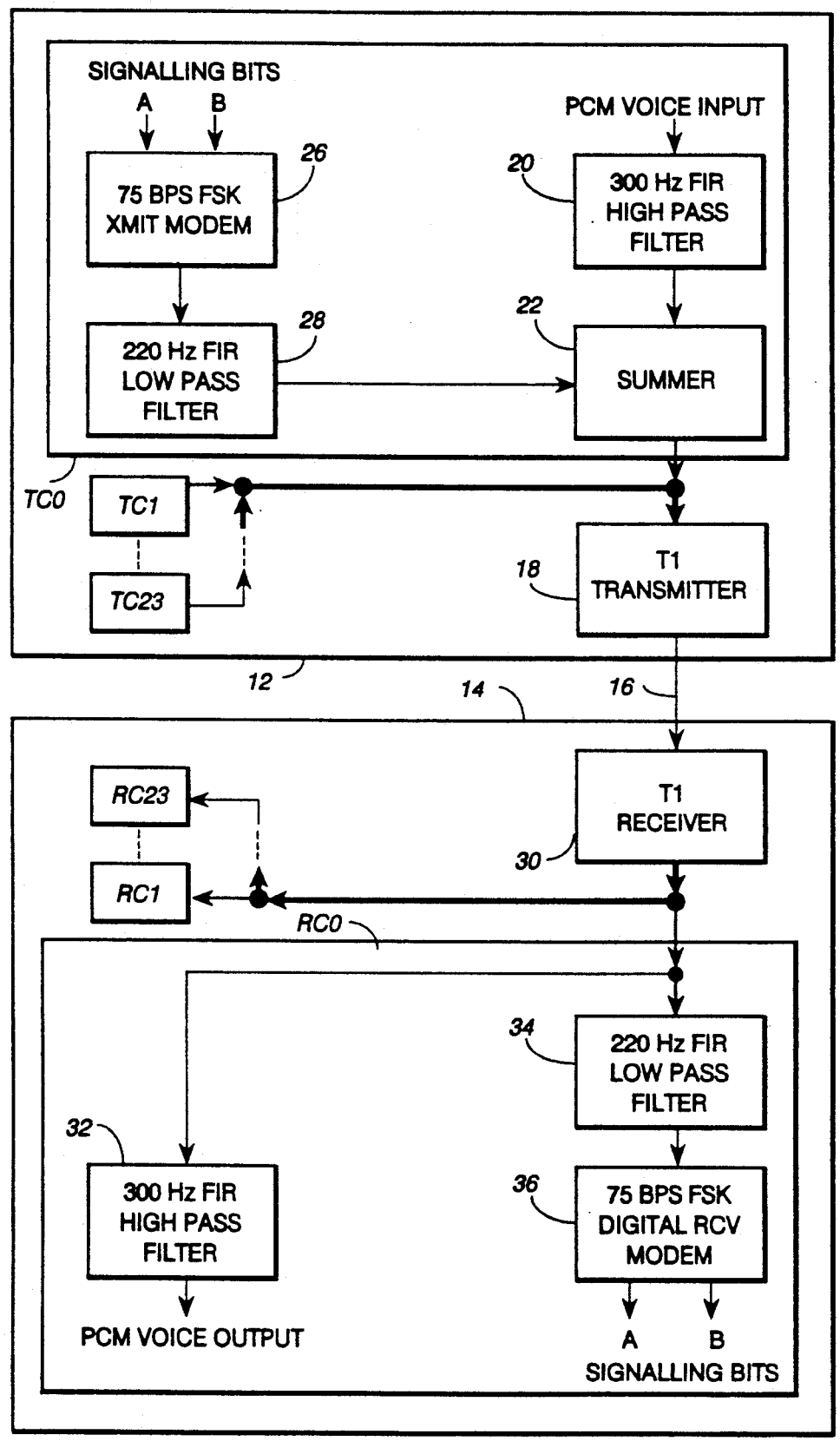
FIG. 1 is a schematic diagram of a digital transmission system embodying the invention.

Referring now to the FIG. 1, reference numeral 10 denotes a T1 based digital transmission system using audio subchannel embedded signalling (ASES) to transmit signalling information in each channel. System 10 comprises a transmitter channel bank 12 and a receiver channel bank 14 interconnected by a T1 digital transmission link 16. Bank 12 includes a T1 transmitter 18 which receives inputs from twenty four transmitting channels TC0-TC23 and drives T1 link 16.

Each of transmitting channels TC0-TC23 is identical so that only one need be described in detail. With reference to channel TC0, an incoming PCM voice input signal is fed into a 300 Hz finite impulse response (FIR) high-pass filter 20 to remove any frequencies below 300 Hz which could corrupt the signalling information band. The PCM voice input is an 8-bit voice sample having a rate of 8000 samples per second. The output of filter 20 is a band limited, 300-3300 Hz, voice grade audio signal that is fed into one input of a two input summer 22. Signalling bits A and B provide the signalling data and are fed into a 75 bps frequency shift keying (FSK) transmit modem 26. The signalling bits are inputted in two serial bit streams with a maximum bit rate of 37.5 bps each (75 bps total). Modem 26 uses two carrier frequencies at 100 Hz and 200 Hz for respectively representing a binary "0" and a binary "1". Bits A and B modulate the carrier frequencies into a sub-300 Hz (sub-audio) frequency modulated signal. The output of modem 26 is connected to the input of a 220 Hz FIR low pass filter 28 which removes any higher frequencies to avoid interfering with the voice communications band. The output of filter 28 is connected to the second input of summer 22 which is operative to add or combine the outputs from 20 and 28 to produce a signal containing both voice and signalling information. Summer 22 has an output connected to transmitter 18 along with similar outputs from the other transmitter channels in bank 12. Transmitter 18 produces a signal that is transmitted by T1 protocol over T1 link 16 in the T1 PCM format explained below with reference to FIG. 2.

Receiver bank 14 comprises a T1 receiver 30 connected to the receiving end of link 16. Receiver 30 produces outputs that are fed to all the receiver channels RC0-RC23 in bank 14. Since such receiving channels are identical, only RC0 is shown in detail. Each receiving channel comprises a 300 Hz FIR high pass filter 32 that recovers the voice information and produces a PCM voice output from the signal produced by receiver 30. A 220 Hz FIR low pass filter 34 is also connected to receiver 30 and functions to filter out the higher frequency voice signal and pass the sub-300 Hz signalling information. A 75 bps FSK digital receive modem 36 then recovers the signalling bits A and B.

Figure 2:
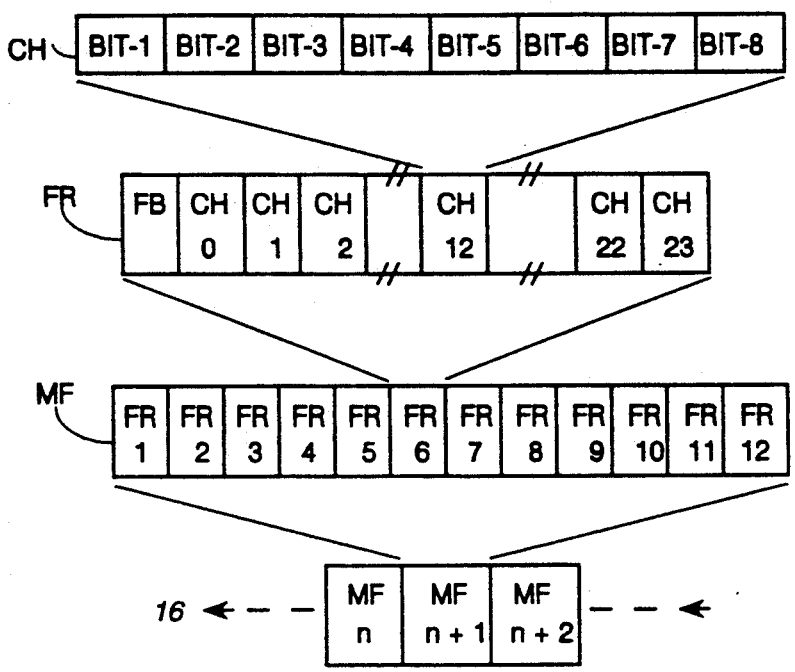
FIG. 2 illustrates the framing format used in transmitting information over the T1 link shown in FIG. 1.

With reference to FIG. 2, the signals on T1 link 16 are transmitted in sequential groups of multiframes MF. For example, MF(n) is transmitted first followed by MF(n+1), MF(n+2), etc. Each multiframe MF comprises twelve frames FR1-FR12. Each frame FR comprises one framing bit FB at the beginning of the frame and twenty four channel signals CH0- CH23 which respectively occupy sequential time slots in each frame. Each channel signal CH comprises eight bits bit-1 through bit-8 with bit-8 being the least significant bit. In accordance with the invention, bit-8 is not used for robbed bit signalling. Also, the eight bits of each channel signal contain both signalling data and voice data, as opposed to only the voice data as in the prior art. Within each multiframe MF, the frames FR are always serially transmitted in the same sequence, and within each frame FR, the channel signals and bits therein are always serially transmitted in the same sequence.

FIG. 3 illustrates a digital transmission system 40 using adaptive pulse code modulation links. In the transmitting portion of the system, an ADPCM modulator 42 has its output connected to T1 transmitter and two inputs connected respectively to two ASES encoders 44 which respectively are connected to channels CH0-23 and CH24-47. One encoder 44 receives as inputs signalling bits SB1 and PCM voice signals PVS1 in the respective channels, and the other encoder receives corresponding signals SB2 and PVS2 for channels CH24-47.

In the receiving portion of system 40, T1 receiver 30 provides an output into an ADPCM demodulator 46 which respectively produces two outputs that are respectively transmitted to two ASES decoders 48 which respectively recover the signalling bits SB1 and SB2 and the voice information PVS1 and PVS2 for channels CH0-23 and CH24-47.

Each ASES encoder 44 is the same as one of the transmitter channels TC (FIG. 1) and comprises filters 20 and 28, a modem 26, and a summer 22, whereby the output of such encoder is the same as the output of summer 22 described previously. ADPCM modulator 42 is operative to compress the two 8-bit signals received from the two encoders 44 into two 4-bit signals that are then serially combined to form an 8-bit signal that is then transmitted by transmitter 18 ADPCM demodulator 46 performs the inverse function and first separates the incoming 8-bit signal into two 4-bit signals that are respectively expanded into two 8-bit signals for input into decoders 48. Each ASES decoder 48 is similar to a receiving channel RC (FIG. 1) whereby the ASES decoders function to recover the signalling bits SB1 and SB2 and the PCM voice signals PVS1 and PVS2 for the respective channels. The advantage of using the ADPCM modulation is that forty eight channels can be transmitted along a single channel instead of only twenty four.

The above embodiments of the invention use discrete modules to perform the different operations and it should be obvious to those skilled in the art that these various functions can be implemented using one or more digital signal processors (DSPs). FIG. 4 shows a transceiving system 49 in which a transceiver 50 includes both a T1 transmitter 18 connected to an outgoing T1 link 16 and a T1 receiver 30 connected to an incoming T1 link 16.

Transmitter 18 is connected to a multitasking DSP 52 that comprises a data store 54 and an instruction store 56. Data store 54 provides a plurality of signalling bit buffers (SBB) 58 for channels CH0-23, a plurality of PCM voice-signal buffers PCMVB 60 for channels CH0-23, and a plurality of T1 PCM input buffers (T1 PCMIB). DSP tasks are stored in instruction store 56 and include a 220 Hz filter task 64, a 300 Hz filter task 66, a transmit modem task 68, and a summer task 70, which tasks simulate the functions of filter 28, filter 20, modem 26, and summer 22 (FIG. 1).

Similarly, receiver 30 is connected to a multitasking DSP 72 that comprises a data store 74 and an instruction store 76. Data store 74 provides a plurality of T1 PCM output buffers (PCMOB) 78 for channels CH0-23, a plurality of PCM voice signal buffers (VSB) 80 for channels CH0-23, and a plurality of signalling bit buffers (SBB) 81 for channels CH0-23. DSP tasks stored in store 76 include a 220 HZ filter task 82, a 300 Hz filter task 84, and a receive modem task 86 which respectively simulate the functions of filter 34, filter 32, and modem 36 (FIG. 1).

The operation of the transmitting portion of system 49 will now be explained relative to FIG. 5. The inputs to DSP 50, which include the PCM voice inputs and the signalling bits in the transmitter channels, are placed in respective ones of buffers 58 and 60. Through software switches SS1-SS3, the information in buffers 58 and 60 is processed one channel at a time and the results are stored in an output buffer 62 corresponding to such channel. The software switches operate together as indicated by dotted line 65 to repetitively sequentially process each channel in order. As indicated in FIG. 5, the switches are set for processing channel CH23. The PCM voice signal stored in each buffer 60 is processed by filter task 66 to attenuate signals below 300 HZ and the input such attenuated signals into summer task 70. Concurrently, the corresponding signalling bit signals stored in the corresponding one of buffers 58 is first processed by filter task 64 to attenuate signals above 220 Hz and then processed by modem task 68 to simulate operation of FSK transmit modem 26. The output of task 60 is fed as a second input to task 70 which then sums the two inputs to produce a signal including both voice and signalling bit information. Such signal is stored in the corresponding buffer 62 and then fed to transmitter 50 to form the channel information CH transmitted by transceiver 50.

With reference to FIG. 6, incoming signals from transceiver 50 are placed in output buffers 78 corresponding to the different channels. A switch SS4 selects one channel at a time to process the information stored in buffers 78. A 300 Hz filter task attenuates signal information below 300 Hz to PCM voice signals that are stored in one of buffers 80 from which the voice information can be outputted from DSP 72. Concurrently, the information from the same one of buffers 78 is processed first by filter task 82 and then by modem task 86 to place signalling bit information in the corresponding one of SBB 81 for output from DSP 72. Tasks 82 and 86 respectively simulate the functions of filter 34 and modem 36.

It should be apparent to those skilled in the art that many changes can be made in the details and arrangements of steps and parts without departing from the scope of the invention as defined in the appended claims.

What is claimed is:

1. A digital transmission system comprising:
   a T1 digital transmission link;
   transmitting means comprising a plurality of transmitter channels and a T1 transmitter;
   said T1 transmitter having an output connected to one end of said link for transmitting time division multiplexed digital signals in a T1 format along said link;
   said T1 format comprising a plurality of successive multiframes, each multiframe including a predetermined number of frames, each frame including a framing bit and a predetermined number of channel signals respectively corresponding to said transmitter channels, each channel signal containing a predetermined number of bits defining a composite signal including signalling information and voice information free from robbed bit signals;
   T1 receiving means connected to said link for receiving said signals transmitted from said T1 transmitter and recovering voice information and signalling information from such received signals;
   each of said transmitter channels comprising
      a first input for receiving pulse code modulated voice signals that form an audio input signal,
      a second input for receiving signal data comprising A-bits and B-bits defining on-hook, off-hook, dialing digits, and call progress information,
      a frequency shift keying transmit modem connected to said second input for receiving said signalling bits and generating two signals of different frequencies below a predetermined frequency, said two signals forming a sub-audio signal,
      a high pass filter connected to said first input for removing signals below a predetermined frequency from said audio input signal,
      a low pass filter connected to said modem for removing signals above a predetermined frequency said sub-audio signals, and
      a summer having first and second inputs respectively connected to said high pass filter and to said low pass filter for receiving filtered signals therefrom and additively combining said filtered signals to produce a composite signal containing both voice and signalling information, said summer having an output coupled to said T1 transmitter, whereby said transmitter receives and transmits composite signals from all of said transmitter channels in said T1 format.

2. A digital transmission system in accordance with claim 1 wherein said T1 receiving means comprises:
   a receiving channel bank comprising a plurality of receiving channels each containing recovery means;
   each of said recovery means comprising filter means connected to said T1 receiver for separating signals received from said receiver into an audio signal containing voice information and a sub-audio signal containing signalling information, each of said recovery means further comprising a frequency shift keying receive modem connected to said filter means for converting said sub-audio signal from said filter means into signalling data comprising A-bits and B-bits.

3. A digital transmission system in accordance with claim 2 comprising:
   digital signal processing means comprising data store means for buffering signalling bit inputs and pulse code modulated voice inputs, and program store means for storing a plurality of tasks implementing said transmitting channels and said receiving channels.

4. A digital transmission system in accordance with claim 2 wherein said audio signals are in a frequency range 300 Hz to 3,000 Hz and said sub-audio signals are below 300 Hz.

5. A digital transmission system in accordance with claim 4 wherein said filter means comprises finite impulse response low pass filters for said sub-audio signals and finite impulse response high pass filters for said audio signals.

6. A digital transmission system in accordance with claim 1 wherein T1 format comprises twenty four frames per multiframe, and eight bits per channel signal, transmitted at a rate of 1.544 megabits per second.

* * * * *